United States Patent [19]

Wolfe

[11] 4,255,180

[45] Mar. 10, 1981

[54] SUPPORT MECHANISM FOR HEAT EXCHANGERS IN FLOAT GLASS APPARATUS

[75] Inventor: Everett G. Wolfe, Manteca, Calif.

[73] Assignee: Libbey-Owens-Ford Company, Toledo, Ohio

[21] Appl. No.: 75,752

[22] Filed: Sep. 14, 1979

[51] Int. Cl.³ .......................................... C03B 18/18
[52] U.S. Cl. .................................... 65/182.1; 65/27; 65/99 A
[58] Field of Search ..................... 65/27, 99 A, 182 R

[56] References Cited

U.S. PATENT DOCUMENTS

| | | | |
|---|---|---|---|
| 3,450,518 | 6/1969 | Itakura et al. | 65/99 A |
| 3,649,237 | 3/1972 | Classen et al. | 65/99 A X |
| 3,653,868 | 4/1972 | Swillinger | 65/182 R |
| 3,653,869 | 4/1972 | Biagini | 65/182 R |

Primary Examiner—Arthur D. Kellogg
Attorney, Agent, or Firm—Collins, Oberlin & Darr

[57] ABSTRACT

Support mechanism is affixed to the external structure of a float glass producing facility for mounting heat exchangers above the ribbon of glass as it is formed on the bath of molten metal. The support mechanism includes spaced pairs of rollers between which the heat exchanger is directed for rolling, cantilevered insertion into the enclosed chamber over the glass ribbon. The frame of the mechanism may be pivotally secured to the structure so that when not in use it may be easily removed or swung to an out-of-the-way storage position.

8 Claims, 5 Drawing Figures

SUPPORT MECHANISM FOR HEAT EXCHANGERS IN FLOAT GLASS APPARATUS

BACKGROUND OF THE INVENTION

1. Field of the Invention

The present invention relates broadly to the manufacture of float glass and, more particularly, to improved means for mounting heat exchangers which extend through the side walls of float glass apparatus.

2. Description of the Prior Art

As is well known, manufacture of flat glass by the float process involves delivering molten glass at a controlled rate onto a bath of molten metal which has a greater density than that of glass (such as tin or alloys of tin, for example) and advancing it along the surface of the bath under physical and thermal conditions which assure that a layer of molten glass will be established on the bath, that from the layer there will develop a buoyant body of molten glass of stable thickness, and the buoyant body in ribbon form will be continuously advanced along the bath and sufficiently cooled as it advances to permit it to be removed from the bath by mechanical conveying means.

Over the bath of molten metal there is provided an enclosed head space or plenum chamber to contain a protective, so-called float atmosphere. This atmosphere is generally comprised of non-oxidizing or reducing gas or gases (usually a mixture of gases such as nitrogen and hydrogen) maintained under sufficient pressure to prevent contamination by infiltration of external atmosphere.

Various devices such as coolers, heaters, water fences, edge rolls, top assistors and linear induction motors are inserted through the side walls of the bath structure to control conditions as the glass moves over the metal bath and assure that a ribbon having the desired characteristics will ultimately be produced. Although it may obviously have general utility in the supporting of various elongated devices, the present invention is particularly adapted for the installation and support of heat exchangers, and particularly coolers, extending over the ribbon upon the molten metal bath of a float glass producing facility, and will be so described herein.

The aforementioned regulating devices, including overhead coolers, are generally supported upon the floor adjacent the bath structure, or by the lower bath structure itself, and connected to various utility service lines outside the bath structure, so that the limited area along side the bath structure often becomes quite congested. In order to vary the heat exchange pattern and achieve the overall temperature pattern desired for production of different compositions and thicknesses of glass, it becomes necessary to periodically install or remove overhead heat exchangers at selected locations along the bath structure. Such exchangers heretofore have generally been of the flat, tubular multipass type which extend transversely across the bath structure and are supported at each end outside the enclosed plenum chamber as by brackets affixed to the structural framework of the bath. They are of considerable length, on the order of twenty feet, and quite heavy so that installation and/or removal requires the services of two or more workers. The exchanger is inserted from one side so as to extend partially across the bath chamber, and its leading end is then engaged from the opposite side by a worker using a hook who then supports and guides the leading end as the exchanger is moved into position. The exchanger is positioned a short distance above the surface of the molten metal bath so that the hook, or even the exchanger itself, may accidentally come in contact with the glass ribbon during the installation or removal, resulting in damage to, if not complete severing of, the ribbon.

One proposal for providing flexibility in the heat exchange pattern on float glass apparatus is set forth in U.S. Pat. No. 3,333,936 to Warren, which discloses overhead heat exchangers having partially insulated surfaces. The heat exchangers are mounted at their ends so as to be selectively rotatable about their longitudinal axes, whereby the rate of heat exchange with the glass may be varied by changing the angular positions of the devices. Another such system is shown in U.S. Pat. No. 3,649,237, issued Mar. 14, 1972, to Classen et al. As disclosed therein, pairs of offset cooling elements extend inwardly from each side of the chamber containing the bath of molten metal. Adjustable roller stands are provided on the floor alongside the bath structure for supporting the coolers from below, and an additional roller mounted above maintains the cooler in engagement with the roller stands. Drive means are provided for moving the coolers inwardly or outwardly along their longitudinal axes in response to observed temperatures of the glass ribbon for varying the heat exchange pattern.

SUMMARY OF THE INVENTION

In accordance with the present invention, when it becomes necessary to alter the temperature pattern of the glass ribbon moving down the bath of molten metal, overhead heat exchangers can be quickly and easily installed, repositioned or removed by a single worker. The exchangers extend partially across the bath structure from either side and are supported cantilever fashion by support carriages affixed to the framework along the sides of the bath structure. The carriages are pivotally attached to the framework so that by simply removing a pin they can be swung downwardly to an out-of-the-way storage position when not in use. The heat exchanger is inserted between pairs of spaced rollers carried by the carriages and rolled axially into the desired position above the glass ribbon. Provision is made for the exchanger to be angularly adjusted both horizontally and vertically.

It is, therefore, a primary object of the invention to provide an improved overhead heat exchanger mounting device for float glass baths.

Another object of the invention is to provide such a device which permits exchangers to be easily installed, adjusted or removed by a single worker.

Another object of the invention is to minimize danger of physical damage to the glass sheet when installing or removing such exchangers.

Still another object to the invention is to provide such a device which is compact and does not unduly interfere with access alongside the bath structure.

Yet another object of the invention is to provide such a device which can be readily moved to an out-of-the-way storage position when not in use.

Other objects and advantages will become more apparent during the course of the following description when taken in connection with the accompanying drawings.

BRIEF DESCRIPTION OF THE DRAWINGS

In the drawings, wherein like numerals refer to like parts throughout.

DESCRIPTION OF THE INVENTION

Figure 1:
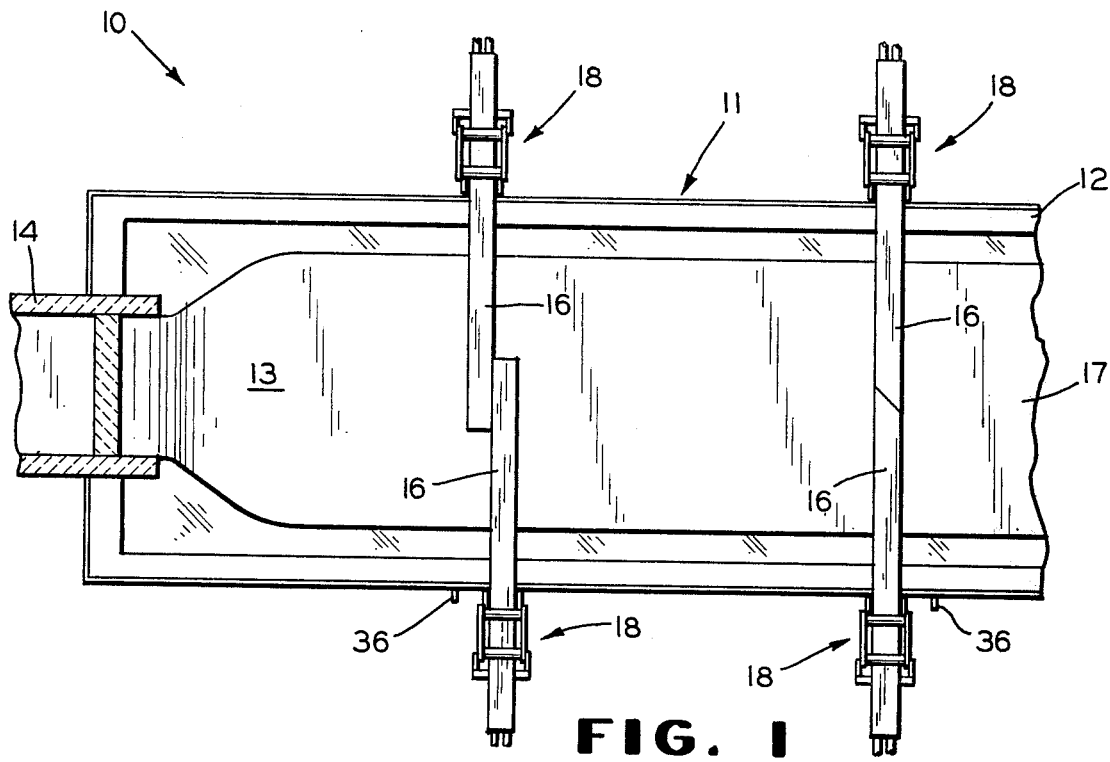
FIG. 1 is a plan view, with superstructure removed, of a typical float glass facility embodying the invention.
Figure 2:
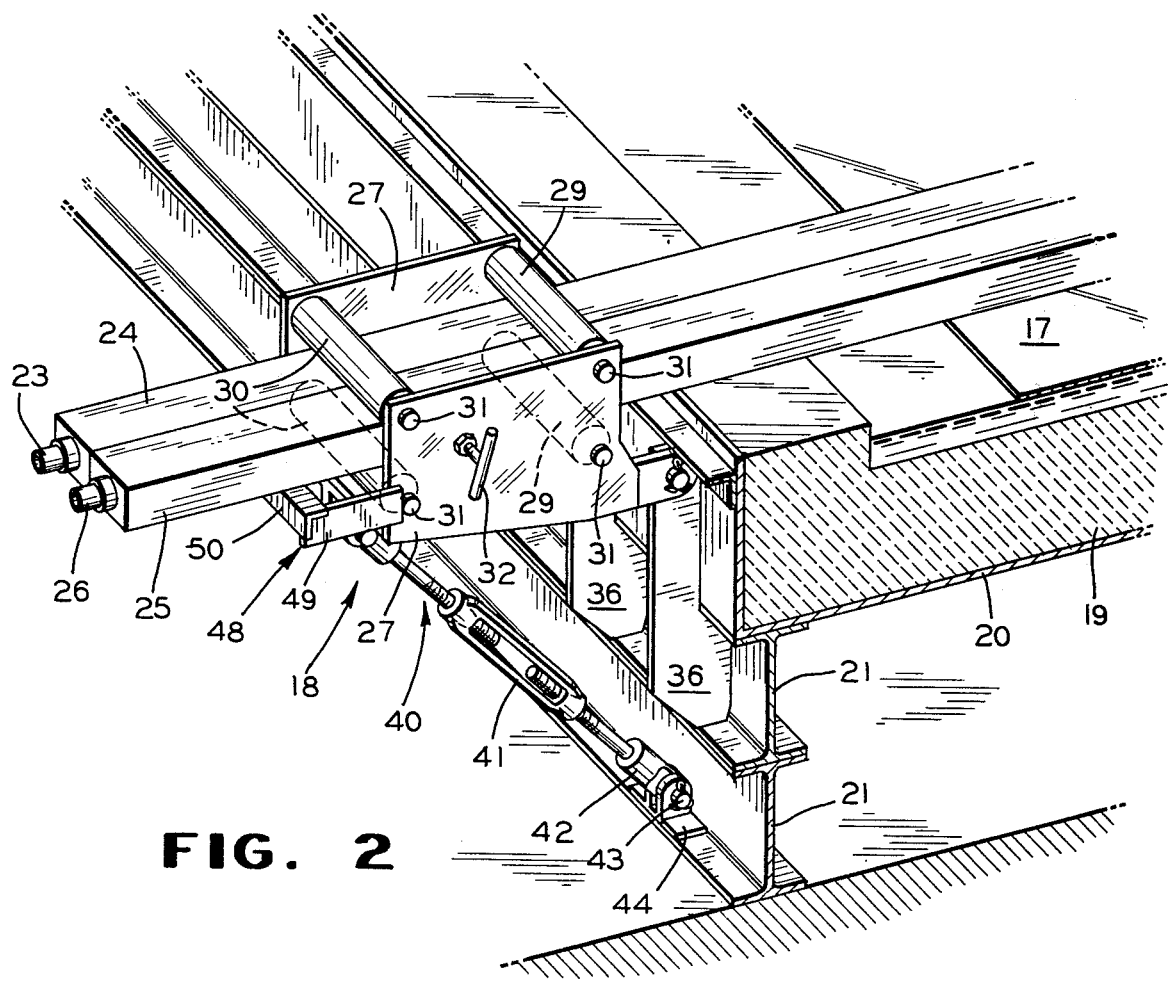
FIG. 2 is an enlarged pespective view of a portion of the float glass bath structure and heat exchanger support mechanism.
Figure 3:
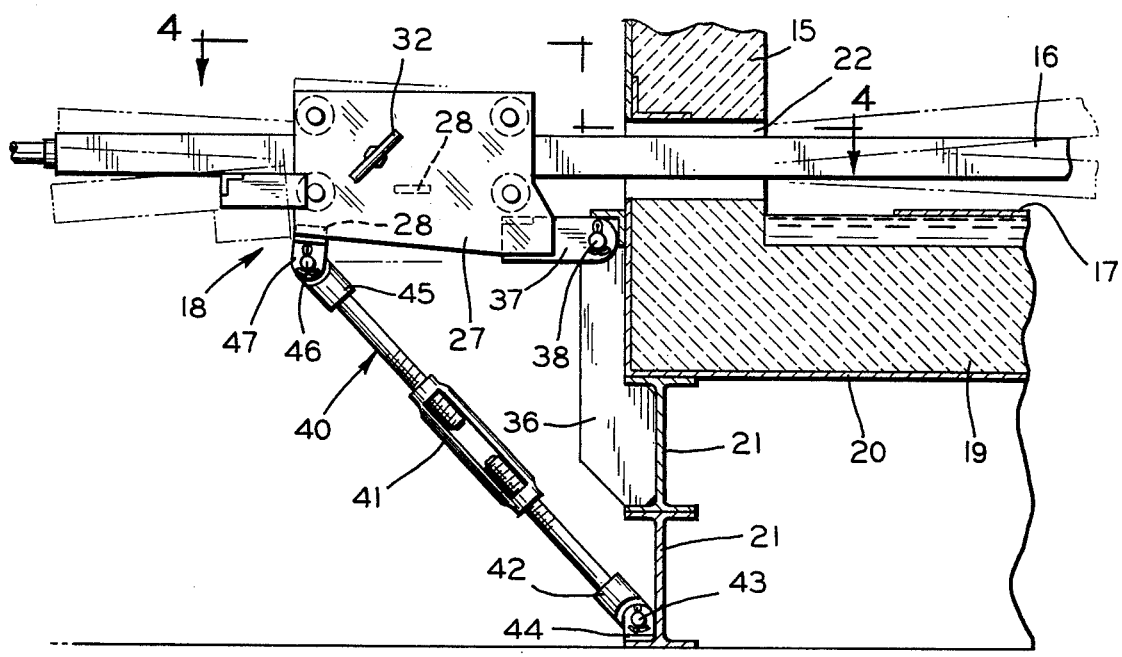
FIG. 3 is a transverse elevational view, partially in section, of the exchanger support mechanism and illustrating the broken lines alternate positions which it may assume for tilting the exchanger upwardly and downwardly.

Referring now to the drawings, there is illustrated generally at 10 in FIG. 1 a typical float glass producing facility similar to the one disclosed in the aforementioned U.S. Pat. No. 3,333,936. More particularly, the facility includes a tank structure 11 containing a bath of molten metal 12 (generally tin or any alloy of tin) onto which a buoyant body of molten glass 13 is continuously delivered in a regulated amount by means of a canal or forehearth 14 from an adjacent continuous melting furnace (not shown). The headspace over the tank structure 11 and molten metal bath 12 is enclosed by side walls 15 (FIG. 3) and end walls and a roof (not shown), and contains a protective gas, known as the float or bath atmosphere, which will not react chemically with the molten glass or metal bath 12. Suitable heaters (not shown) and cooling means, including overhead heat exchangers 16, are provided to maintain a desired temperature pattern in the glass so that as it is moved over the molten metal bath from the entrance end it will flow outwardly under the influences of surface tension, gravity and other physical constraints to become a continuous ribbon 17 of stable width and thickness. By the time it has moved over the metal bath to the discharge and thereof (not shown), it has progressively cooled and attained a condition of stiffness permitting it to be transferred to an adjacent annealing lehr by mechanical conveying means (not shown) without damage to its surfaces.

As will be readily apparent, production of various types and thicknesses of glass ribbon necessitates changes in the number and location of overhead heat exchangers 16 in order to provide the desired temperature pattern. To this end, in accordance with the invention support carriages, shown generally at 18, are provided at various locations along each side of the tank structure 11 for carrying the heat exchangers. The tank structure includes a refractory lining 19, within which the molten metal 12 is contained, covered by a metallic casing 20, and is supported upon structural beams 21. The upper walls 15, of similar refractory and metallic casing construction, are suspended from an upper structural framework (not shown) so as to leave elongated access openings 22 extending throughout the length of the facility on either side between the top of the side walls of the tank structure 10 and the bottom of the upper side walls 15. The heat exchangers 16, as well as various other well-known regulatory devices such as edge rolls, top assistor rolls, water fences and linear motors, are inserted through these access openings. In order to seal the bath chamber, the access openings are closed by removable side seal panels (not shown) between the regulatory devices, and a sealing material such as refractory cloth or cement is packed around the regulating devices within the access opening. The aforementioned aspects of the tank structure are of conventional construction and do not form part of the present invention.

The heat exchangers 16 are generally rectangular in cross-section and are formed of at least two tubular sections arranged side by side and interconnected at their inner ends in the well-known manner of so-called stub heat exchangers. In other words, a heat exchanging medium enters through an inlet 23 and flows along an associated tubular section 24 to the interior end of the exchanger, and then back along the other tubular section 25 to an outlet 26.

Figure 4:
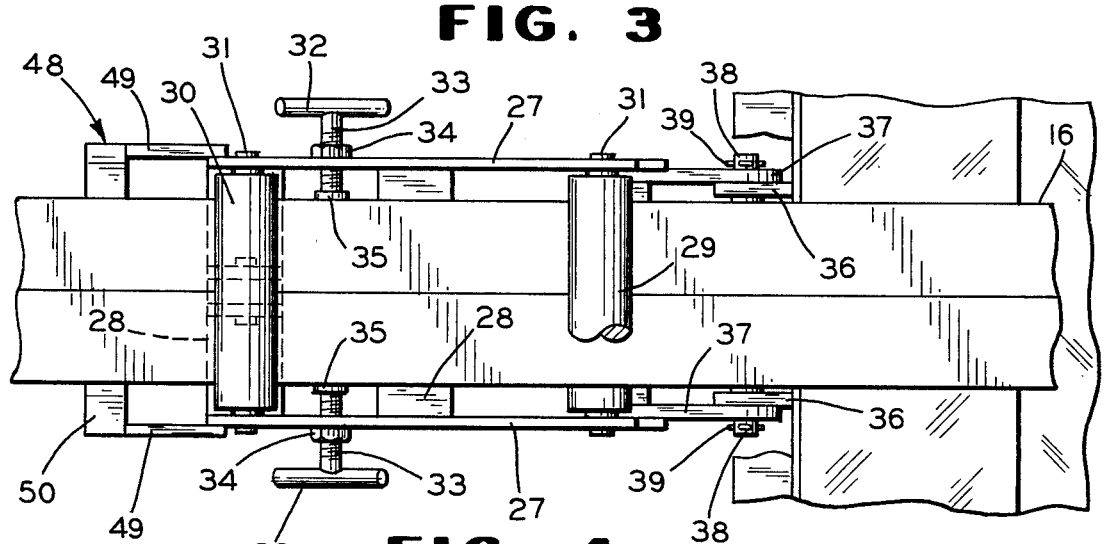
FIG. 4 is an enlarged plan view of the exchanger support mechanism, with parts broken away, taken substantially along line 4—4 of FIG. 3.

The support carriages 18 by which the heat exchangers are carried comprise a pair of spaced end plates 27 interconnected by bars 28 affixed thereto as by welding. The heat exchanger is positioned between inner and outer pairs of spaced, freely rotatable rollers 29 and 30, respectively, whose axle shafts 31 are received in openings in the end plates and suitably secured against endwise movement as by cotter pins (not shown). As best seen in FIG. 4, in order to secure the heat exchanger against longitudinal movement with the support carriage, a pair of opposed clamps 32 is provided. The stems 33 of the clamps are threaded through nuts 34 affixed to the end plates 27, and pads 35 on the stems bear against the opposite edge walls of the heat exchanger. Thus, by manipulating the clamps the heat exchanger can, where desired, be swung angularly by a limited amount and secured in a selected longitudinal position.

The support carriages 18 are affixed to the tank structure 11 by means of pairs of spaced bracket plates 36 secured to the structural beams 21 as by welding. Hinge arms 37 affixed to the end plates 27 of the carriage are pivotally connected to the bracket plates by a pin 38 extending therethrough and secured by cotter pins 39. The carriage is supported at its outer end by a strut assembly 40 whose length is adjustable so that the carriage can be pivotally adjusted about the pin 38. More particularly, the strut comprises a turnbuckle 41 whose lower end fitting 42 is pivotally connected by means of a pin 43 to a yoke 44 on the beam 21. An upper end fitting 45 of the turnbuckle is likewise pivotally connected by a pin 46 to a yoke 47 affixed to one of the bars 28 of the carriage. Thus, by manipulating the turnbuckle 41 to lengthen or shorten the strut assembly, the support carriage 18 can be pivoted about the pin 38 and the heat exchanger pivoted accordingly in a vertical plane.

In order to assist in installing or removing the heat exchangers 16, a shelf 48, including a pair of arms 49 affixed to the end plates 27 and a cross member 50 extending therebetween, is provided on the rear of the support carriage. The shelf is particularly useful when a heat exchanger is to be installed or removed by a single worker in that the forward end of the exchanger can be rested upon the cross member 50 while the rear end is manipulated to align the exchanger with the pass between the outer pair of rollers 30 for installation or lowered to the floor for removal.

Figure 5:
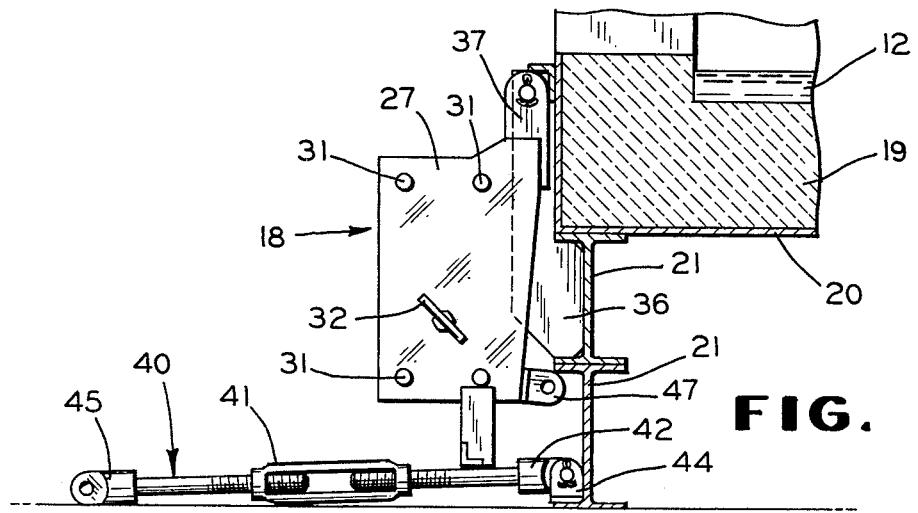
FIG. 5 is an elevational view similar to FIG. 3 but illustrating the support mechanism in a storage position.

Briefly reviewing operation of the invention, it will be readily apparent that provision may be made for locating support carriages 18 at a number of stations along each side of the facility 10. For this purpose, it is contemplated that pairs of the brackets 36 and lower yokes 44 may be provided at frequent intervals along the structural beams 21 wherever it is anticipated that a heat exchanger might be required. When it then becomes necessary to install an exchanger at a particular location, if not already in position a support carriage 18 is installed by inserting a pin 38 through the brackets 36 and hinge arms 37 and connecting the strut 40 to the lower and upper yokes 44 and 47. The exchanger is then inserted by resting its forward end upon the shelf 48 and pushing it forwardly between the pairs of rollers 29 and 30. When inserted to the desired position, the clamps 32 are tightened to securely hold it in place. The turnbuckle 40 may also be manipulated to level the exchanger or tilt it upwardly or downwardly, as shown in the broken line positions of FIG. 3, to vary the heat exchange pattern with the ribbon 17. When a heat exchanger is no longer required at a particular location, it is removed by the reverse procedure. The support carriage 18 may be completely removed, or it may simply be pivoted downwardly to an out-of-the-way storage position as illustrated in FIG. 5 by removing the pin 46, or the pins 43 and 46, from the strut assembly.

Of course, when a heat exchanger 16 is inserted from one side of the tank structure 11, a corresponding exchanger will generally also be inserted from the opposite side as illustrated in FIG. 1 to create balanced temperature conditions across the metal bath 12 and ribbon 17. Where a generally uniform heat exchange pattern across the ribbon is sought, the opposed exchangers are longitudinally aligned in an end abutting relationship as illustrated by the pair on the right in FIG. 1. The ends of the exchangers generally extend perpendicular to the longitudinal axis as illustrated in the embodiment at the left in FIG. 1. In order to avoid creation of an abrupt temperature differential at the point where the two ends abut, which might result in a longitudinal streak in the ribbon 17, the ends may be arranged diagonally as illustrated by the aligned pair in FIG. 1 so that the line along which they abut is not parallel to the direction of advance of the ribbon. Should additional heat exchange capacity be desired in the central region, the exchangers may be offset and overlapped as illustrated by the pair on the left in FIG. 1. To that end, a third bracket 36 may be provided with the previously described pair at the heat exchanger stations along at least one side of the tank structure 11, as shown in FIG. 1, so that the support carriages 18 can be offset to carry the opposed exchangers in overlapping, parallel relationship.

It is to be understood that the forms of the invention herewith shown and described are to be taken as preferred embodiments of the same, and that various changes in the shape, size and arrangement of parts may be resorted to without departing from the spirit of the invention.

I claim:

1. In apparatus for the manufacture of flat glass by the float process including a bath of molten metal continued within an elongated tank structure having opposite sides, and a heat exchanger extending transversely above the ribbon of glass as it advances across the molten metal bath between said opposite sides, the improvement comprising a support carriage affixed to the tank structure along the side thereof through which said heat exchanger extends, said support carriage including inner and outer pairs of spaced, vertically aligned, rotatable rollers located closely adjacent said side, the rollers of each said pair being spaced apart a distance slightly greater than the depth of said heat exchanger so that their peripheral surfaces engage the top and bottom surfaces of said heat exchanger whereby said exchanger is contilevered over said ribbon.

2. Apparatus for the manufacture of flat glass by the float process as claimed in claim 1, wherein said support carriage includes a pair of end plates, said rollers engaging said heat exchanger extending between said end plates.

3. Apparatus for the manufacture of flat glass by the float process as claimed in claim 2, wherein said rollers engaging said heat exchanger are freely rotatable with their axles carried by said end plates, whereby said heat exchanger can be moved longitudinally through said support carriage.

4. Apparatus for the manufacture of flat glass by the float process as claimed in claim 1, including means pivotally connecting said support carriage to said tank structure at its inner end and a strut supporting the outer end of said carriage.

5. Apparatus for the manufacture of flat glass by the float process as claimed in claim 4, wherein said strut is adjustable in length whereby said support carriage and heat exchanger can be pivoted vertically about said pivotal connection.

6. Apparatus for the manufacture of flat glass by the float process as climed in claim 2, claim 3 or claim 4, including a shelf at the outer end of said support carriage for carrying the end of said heat exchanger as it is being inserted into or removed from said support carriage.

7. Apparatus for the manufacture of flat glass by the float process as claimed in claim 2, claim 3 or claim 4, including clamp means on said end plates for selectively engaging the side walls of said heat exchanger to immobilize said exchanger within said support carriage.

8. In apparatus for the manufacture of flat glass by the float process including a bath of molten metal contained within an elongated tank structure having opposite sides, and a heat exchanger extending transversely above the ribbon of glass as it advances across the molten metal bath between said opposite sides, the improvement comprising a support carriage affixed to the tank structure along the side thereof through which said heat exchanger extends, said support carriage comprising means engaging the top and bottom surfaces of said heat exchanger whereby said exchanger is cantilevered over said ribbon, and including a pair of end plates secured in spaced parallel relation, spaced pairs of inner and outer freely rotatable rollers having their axles carried by said end plates with their peripheral surfaces comprising said surface engaging means, a hinge arm extending from the inner end of each said end plate, a spaced pair of brackets secured to the structural framework of the tank structure, a pin extending through said hinge arms and brackets to hingedly secure said support carriage to said tank structure, and a removable strut extending between the outer end of said support carriage and said structural framework for maintaining said carriage and heat exchanger in operative position.

* * * * *

UNITED STATES PATENT AND TRADEMARK OFFICE
CERTIFICATE OF CORRECTION

PATENT NO. : 4,255,180

DATED : March 10, 1981

INVENTOR(S) : Everett G. Wolfe

It is certified that error appears in the above-identified patent and that said Letters Patent are hereby corrected as shown below:

Col. 3, line 45, "and" should be --end--
Col. 5, line 62, "continued" should be --contained--
Col. 6, line 32, "climed" should be --claimed--

Signed and Sealed this

Eleventh Day of August 1981

[SEAL]

Attest:

Attesting Officer

GERALD J. MOSSINGHOFF

Commissioner of Patents and Trademarks